United States Patent
Cabrera et al.

(10) Patent No.: US 7,666,336 B2
(45) Date of Patent: Feb. 23, 2010

(54) PROCESS FOR THE PRODUCTION OF MONOLITHIC MOULDINGS

(75) Inventors: Karin Cabrera, Dreieich (DE); Peter Knoell, Gross-Bieberau (DE)

(73) Assignee: Merck Patent GmbH, Darmstadt (DE)

( * ) Notice: Subject to any disclaimer, the term of this patent is extended or adjusted under 35 U.S.C. 154(b) by 410 days.

(21) Appl. No.: 10/578,193

(22) PCT Filed: Oct. 15, 2004

(86) PCT No.: PCT/EP2004/011627

§ 371 (c)(1),
(2), (4) Date: May 4, 2006

(87) PCT Pub. No.: WO2005/046834

PCT Pub. Date: May 26, 2005

(65) Prior Publication Data

US 2007/0065356 A1 Mar. 22, 2007

(30) Foreign Application Priority Data

Nov. 6, 2003 (DE) .................................. 103 51 798

(51) Int. Cl.
*C04B 35/624* (2006.01)

(52) U.S. Cl. .................. 264/42; 264/621; 264/226; 264/341; 210/656; 65/17.2

(58) Field of Classification Search ................ 210/511, 210/644, 656; 264/226, 602, 621, 42, 341; 423/338; 65/17.2

See application file for complete search history.

(56) References Cited

U.S. PATENT DOCUMENTS

| 4,017,528 | A | | 4/1977 | Unger et al. | |
|---|---|---|---|---|---|
| 4,169,790 | A | * | 10/1979 | Pretorius et al. | ............. 210/656 |
| 4,376,641 | A | * | 3/1983 | Nestrick et al. | .................. 95/83 |
| 4,865,707 | A | * | 9/1989 | Karger et al. | ................ 204/453 |
| 5,145,579 | A | * | 9/1992 | Eguchi et al. | ............. 210/198.2 |
| 5,637,135 | A | * | 6/1997 | Ottenstein et al. | .............. 96/101 |
| 5,869,152 | A | | 2/1999 | Colon | |
| 6,210,570 | B1 | | 4/2001 | Holloway | |
| 6,410,631 | B1 | * | 6/2002 | Oh | ............................ 524/386 |
| 6,457,329 | B1 | * | 10/2002 | Bhandarkar et al. | ........... 65/17.2 |
| 2003/0155676 | A1 | | 8/2003 | Lubda et al. | |

FOREIGN PATENT DOCUMENTS

| JP | 2002293657 | 10/2002 |
|---|---|---|
| WO | WO 9503256 | 2/1995 |
| WO | WO 9829350 | 7/1998 |
| WO | WO 9938006 | 7/1999 |
| WO | WO 9950654 | 10/1999 |
| WO | WO 03014450 | 2/2003 |

OTHER PUBLICATIONS

Frantisek Svec, Eric C. Peters, David Sykora, Jean M.J. Frechet; Design of the monolithic polymers used in capillary electrochromatography columns, Jul. 2000, Journal of Chromatography A, vol. 887, pp. 3-29.*

Norio Ishizuka, Kazuki Nakanishi, Kazuyuki Hirao; Preparation and Chromatographic Application of Macroporous silicate in a capillary, Dec. 2000, Journal of Sol-Gel Science and Technology, vol. 19, pp. 371-375.*

Nobuo Tanaka, Hiroshi Kobayashi, Norio Ishizuka, Hiroyoshi Minakuchi, Kazuki Nakanishi, Ken Hosoya, Tohru Ikegami; Monolithic silica columns for high-effiency chromatographic seperations, Aug. 2002, vol. 965, pp. 35-49.*

Xiangmin Zhang, Shuang Huang; Single Step On-Column Frit Making For Capillary High-Performance Liquid Chromatography Using Sol-Gel Technology, 2001, Journal of Chromatography A, vol. 910, pp. 13-18.*

Huber et al. "Preparation and evaluation of packed capillary columns for the separation of nucleic acides by ion-pair reversed-phase high-performance liquid chromatography" J. Chromatograpphy A, Bd. 893, 2000, XP004210371.

Hjerten et al. (Nature 356, S. 810-811, 1992).

Frechet et al. (Anal. Chem., 64, S 820-822, 1993).

* cited by examiner

*Primary Examiner*—Joseph S Del Sole
*Assistant Examiner*—Timothy Kennedy
(74) *Attorney, Agent, or Firm*—Millen, White, Zelano, Branigan, P.C.

(57) ABSTRACT

The invention relates to a method for producing monolithic molded elements e.g. as sorbents for chromatographic columns or capillary vessels. The aim of the invention is for said molded elements to be able to remain directly in the gel mold thereof following the production process. Said aim is achieved by the inventive method, according to which the surface of the gel mold is activated by etching, increasing the surface, or chemically modifying the surface before the gelling mold is filled with the monomer sol.

6 Claims, No Drawings

PROCESS FOR THE PRODUCTION OF MONOLITHIC MOULDINGS

The invention relates to a process for the production of monolithic mouldings, such as chromatography columns or capillaries containing monolithic sorbents, which can remain directly in their gelling mould after production. The invention furthermore relates to mouldings, such as chromatography columns or capillaries containing monolithic sorbents, which have been produced by the process according to the invention.

Monolithic sorbents are constantly increasing in importance in the area of chromatography, in particular HPLC, micro-LC or electrochromatography. They exhibit significantly better mass-transport properties than columns or capillaries containing particulate sorbents. For this reason, columns containing monolithic sorbents can be operated at a higher linear flow rate with the same performance.

Monolithic sorbents can be formed on the basis of organic or inorganic polymers. Owing to the different properties of the polymers, various processes are currently being employed for the production of chromatography columns based on monolithic sorbents.

Polymers having low shrinkage rates, i.e. soft polymer gels, can be prepared directly in the tubes used for the chromatography as gelling mould. Hjerten et al. (Nature, 356, pp. 810-811, 1992) describe, for example, monoliths of a polyacrylamide material which are produced inside a chromatography tube. Frechet et al. (Anal. Chem., 64, pp. 820-822, 1992) describe the preparation of polyacrylate materials and polystyrene-divinylbenzene copolymers which become monolithic materials having a macroporous structure in the presence of porogens and can remain in the mould used after production.

However, polymers of this type have some disadvantages for chromatography. For example, they frequently have inadequate mechanical stability. Furthermore, the pore distribution of the materials is often unfavourable since an excessive number of micropores arise. This adversely affects the efficiency and symmetry of the columns. The materials also frequently exhibit unfavourable swelling behaviour.

Significantly better separation properties are shown by monolithic porous inorganic mouldings or, in some cases, highly crosslinked, hard organic polymer gels. However, these materials shrink during preparation, meaning that they cannot be prepared directly in the chromatography tubes. The dead space formed between the moulding and the chromatography tube would reduce the separation efficiency to an excessive extent. In the case of inorganic monoliths produced by a sol-gel process, the shrinkage after ageing is, for example, up to 20% of the initial diameter. The materials must therefore be removed from the gelling moulds after preparation and subsequently clad with tightly sealing tubes.

WO 99/38006 and WO 99/50654 disclose processes for the production of capillaries which are filled with monolithic silica material. This material can remain directly in the capillary after preparation. However, the methods disclosed therein are only suitable for the production of capillary columns having a relatively small diameter.

The object of the present invention was therefore to provide a process for the production of monolithic chromatography columns in which the sorbent can remain in the gelling mould, i.e. the column tube, after preparation. The process should be suitable, in particular, for inorganic materials and enable the filling of column tubes having a diameter of between 0.05 mm and 100 mm.

It has been found that monolithic mouldings can be produced in their gelling mould without a dead space forming between the moulding and gelling mould due to shrinkage if the inside surface of the gelling mould is activated before the synthesis. Suitable activation methods are, for example, surface etching, increasing the surface area or chemical modification of the inside surface of the gelling mould. In this way, the monolith can remain in the original gelling mould and be employed directly for chromatographic separation.

The present invention therefore relates to a process for the production of monolithic porous mouldings which completely fill their gelling mould, characterised by the following process steps:
a) provision of a gelling mould;
b) activation of the gelling mould by surface etching, increasing the surface area and/or chemical modification;
c) filling of the gelling mould with monomer sol;
d) polymerisation of the monomer sol and ageing of the resultant gel for the formation of pores.

In a preferred embodiment, a gelling mould made from glass, glass-coated stainless steel or fused silica is provided in step a).

In a further preferred embodiment, the activation in step b) is carried out by increasing the inside surface area of the gelling mould by treating the inside surface with alkoxysilanes and/or organoalkoxysilanes and/or slurries of particles.

In another preferred embodiment, the activation in step b) is carried out by chemical modification of the inside surface of the gelling mould by treating the surface with bifunctional reagents.

In a preferred embodiment, a sol-gel process is used for the production of the monolithic porous mouldings.

In a further preferred embodiment, a monomer sol which comprises particles and/or fibres and/or organoalkoxysilanes and thus exhibits low shrinkage rates is used in step c).

The present invention also relates to monolithic porous mouldings which have been polymerised into their gelling mould, obtainable by the process according to the invention.

The present invention relates to the use of the mouldings according to the invention in the gelling mould for the chromatographic separation of at least two substances.

The mouldings can be produced using various processes known to the person skilled in the art, such as processes for, for example, free-radical polymerisation or also sol-gel processes. The solutions comprising the starting substances for the production of the monoliths are referred to in accordance with the invention as monomer sol, irrespective of the manner in which they are polymerised or gelled.

The process according to the invention is particularly suitable for the production of inorganic porous monolithic mouldings by a sol-gel process. WO 95/03256 and particularly WO 98/29350 disclose processes which are preferred in accordance with invention for the production of inorganic monolithic mouldings by a sol-gel process. These materials contain mesopores having a diameter of between 2 and 100 nm and macropores having an average diameter of greater than 0.1 µm and are thus particularly suitable for chromatographic use.

The process according to the invention is also suitable for the preparation of materials having a different pore distribution. For example, it is also possible to produce materials having a monomodal pore distribution, for example materials having an average pore diameter of between 10 nm and 200 nm.

The mouldings can be produced, for example, by hydrolysing and polycondensing alkoxysilanes in a gelling mould under acidic conditions in the presence of a pore-forming phase, for example an aqueous solution of an organic polymer, to give a porous gel element. The gel is then aged, and finally the pore-forming substance is separated off. Without the gelling mould treatment according to the invention, the polymerisation or polycondensation causes a change in the gel structure and shrinkage of the gel. In the processes in accordance with the prior art, this causes the formation of a dead space between the gelling mould and the moulding.

Depending on the type of monomers and, if used, pore formers employed, the specific way in which the process according to the invention is carried out can vary. For example, it is not necessary to use an additional mesopore former (for example urea) if organoalkoxysilanes, for example, are used. In such cases, it is frequently not possible to distinguish between a gelling step and an ageing step carried out independently thereof since the ageing already takes place during the gelling step. In accordance with the invention, "polymerisation of the monomer sol and ageing of the resultant gel for the formation of pores" therefore means that gelling and ageing may take place successively, for example under different temperature conditions, or also quasi in parallel through no further changes in the reaction conditions taking place after the gelling conditions and thus also no separately evident ageing step being carried out.

In accordance with the invention, the term gelling mould is taken to mean the mould into which the monolithic mouldings are polymerised completely, i.e. with an accurate fit without dead spaces, during the production according to the invention. Since the mouldings polymerised in accordance with the invention are preferably employed as separating columns for chromatography, the gelling mould at the same time represents the cladding of the chromatography column. It is no longer necessary in accordance with the invention to remove the mouldings from the gelling mould for chromatographic use and to provide them with a new cladding. The gelling mould therefore typically has a size and shape which is usual for capillaries, analytical or preparative chromatography columns. The gelling mould can equally also have other shapes, for example conical shape or cuboid shape, for other applications. For example, the process according to the invention is also suitable for the provision of monolithic mouldings for use in SPE (solid phase extraction) or SPME (solid phase microextraction) or for sample preparation in general. In this case, the gelling mould is, for example, a cartridge or pipette tip.

The gelling mould can consist of metal (for example stainless steel) or plastic or preferably of materials which are coated on the inside with glass (for example stainless steel with glass inliner), ceramic, glass or other silica materials, such as, for example, fused silica. The person skilled in the art is able to make the choice of these materials on the basis of the planned application, the conditions for activation of the surface of the gelling mould, the reaction conditions and the reactants employed.

In accordance with the invention, polymerised in completely, i.e. with an accurate fit without dead spaces, means that the gelling mould is filled by the moulding in such a way that the chromatographic separation efficiency is no longer impaired by cavities formed by shrinkage processes in the edge regions between the monolithic moulding and the gelling mould.

The process according to the invention can be employed for the production of chromatography columns having internal diameters of 50 µm to 100 mm, preferably between 0.5 mm and 50 mm.

The activation according to the invention of the inside surface of the gelling mould increases the contact between the monomer sol or the monolithic moulding formed and the surface of the gelling mould. This is preferably carried out by increased formation of chemical bonds between the moulding and the gelling mould. It has been found that various types of activation of the surface of the gelling mould are suitable. The type of activation that is suitable for the particular synthesis depends on the material of the gelling mould and the composition of the monomer sol.

1. Surface Etching

This method is particularly suitable for gelling moulds made from ceramic, glass or other materials based on silica or for moulds which are coated with such materials. In this case, at least the inside surface of the gelling moulds is etched using strong acids or strong bases. In this way, for example, activated silanol groups, which are able to react with the monomer sol, are formed to an increased extent on the inside surface of the mould. Furthermore, strong bases cause partial dissolution of the silicate structure of the glass, with the consequence of an increase in the surface area. Suitable strong acids or bases are, for example, HF, HCl, $HNO_3$ or $H_2SO_4$, NaOH, KOH, $NH_4OH$, preferably HF and HCl or NaOH. The duration of the treatment depends on the material of the gelling mould. In general, the moulds are treated at temperatures between 25° C. and 80° C. for between 5 minutes and 24 hours. The treatment can be carried out by immersion of the entire mould or rinsing or filling of the interior of the gelling mould. In the case of the use of a base, the final step is rinsing with dilute acid (for neutralisation), with water and finally with an organic solvent, such as, for example, ethanol, or, in the case of the acid, rinsing with water and an organic solvent and filling the mould with monomer sol.

2. Increasing the Surface Area

Another very effective method for the production in accordance with the invention of monolithic chromatography columns is increasing the inside surface area of the gelling mould.

In this case, the gelling mould is pre-treated with a solution or slurry. The solution consists of a monomer sol similar to that used later for the formation of the monolithic moulding, i.e. like the monomer sol it comprises alkoxysilanes. These alkoxysilanes are able to react with the inside surface of the gelling mould, where they polymerise out and/or are sintered on. In this way, a coating forms on the inside surface of the gelling mould, increasing the inside surface area through its build-up and its structure. Suitable alkoxysilanes are tetraalkoxysilanes $(RO)_4Si$, where R is typically an alkyl, alkenyl or aryl radical, such as C1 to C20 alkyl, C2 to C20 alkenyl or C5 to C20 aryl, preferably a C1 to C8 alkyl radical. Particular preference is given to tetraethoxy- and in particular tetramethoxysilane. The tetraalkoxysilane may equally contain different alkyl radicals.

In another embodiment, organoalkoxysilanes or mixtures of organoalkoxysilanes with tetraalkoxysilanes can be employed instead of an alkoxysilane or mixtures of two or more alkoxysilanes. Suitable organoalkoxysilanes are those in which one to three, preferably one, alkoxy groups of a tetraalkoxysilane have been replaced by organic radicals, such as, preferably, C1 to C20 alkyl, C2 to C20 alkenyl or C5 to C20 aryl. Further organoalkoxysilanes are disclosed, for example, in WO 03/014450 or U.S. Pat. No. 4,017,528. Instead of in their monomeric form, the alkoxysilanes or organoalkoxysilanes can also be employed in pre-polymerised form as, for example, oligomers. The tetraalkoxysilanes or organoalkoxysilanes are typically employed as a 2 to 25%, preferably 5 to 10% (% by weight) solution in an organic solvent, such as, for example, toluene. The treatment of the gelling mould is preferably carried out at an elevated temperature of between 50 and 150° C., for example by refluxing in toluene. The duration of the treatment is generally between 1 and 40 hours, typically 10 to 25 hours.

In another preferred embodiment, the solution additionally comprises particles and is thus a particle suspension or slurry. The particles typically have a diameter of between 25 nm and 10 µm, preferably between 50 nm and 1 µm, and typically consist of plastic, ceramic, glass or inorganic oxides, such as, for example, Ti, Al, Zr or Si oxides. They preferably have a hydrophilic surface. However, hydrophobically derivatised particles, for example containing C1-C20 alkyl radicals, are also particularly suitable if the monomer sol consists of organoalkoxysilanes and/or mixtures of organoalkoxysilanes with alkoxysilanes. Due to hydrophobic interactions, the polymerisation here preferably takes place at the beginning on the inside surface.

The particles may be non-porous or porous. Spherical or irregularly shaped particles are suitable. Particular preference is given to silica particles having a diameter of between 50 nm and 1 µm.

In general, the gelling moulds are treated with the solution or slurry at temperatures between 25° C. and 100° C. for between 1 and 24 hours. The treatment can be carried out by immersion of the entire mould or rinsing or filling of the interior of the gelling mould. The gelling moulds are subsequently removed from the particle suspension or slurry and dried over the course of several hours without further treatment.

If desired or if necessary for later use, the gelling moulds may also be heated. In the case of coating with tetraalkoxysilanes or purely inorganic particles, calcination can be carried out at up to 600° C. If organoalkoxysilanes or particles having organic constituents have been employed, the temperatures should be between 100 and 300° C., unless the organic residues are to be burnt out.

3. Chemical Modification

In this case, the inside surface of the gelling mould is treated with reagents which have at least two, preferably three or four, functionalities. In accordance with the invention, suitable reagents having at least two functionalities are referred to as bifunctional reagents. It is assumed that the reduction in shrinkage after treatment of the surface with these reagents is caused by at least one functionality reacting with the surface of the gelling mould and at least one functionality being available for reaction with the monomer sol.

Alkoxysilanes or organoalkoxysilanes, for example, are suitable here. Particular preference is given to bisfunctional silanes of the formula I

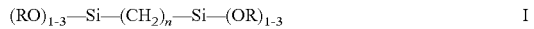

$(RO)_{1-3}$—Si—$(CH_2)_n$—Si—$(OR)_{1-3}$   I where R is typically an alkyl, alkenyl or aryl radical, such as C1 to C20 alkyl, C2 to C20 alkenyl or C5 to C20 aryl, preferably a C1 to C8 alkyl radical, and n is preferably 1 to 8.

Examples of preferred compounds are BTME (bis(trimethoxysilyl)ethane, where R=methyl and n=2)), bis(triethoxysilyl)ethane, bis(triethoxysilyl)methane and bis(triethoxysilyl)octane.

mono, di- or trifunctional alkoxysilanes having a fourth terminal function, of the formula II

$(RO)_n R'_m Si$—$R^*$   II where R and R' are typically, independently of one another, an alkyl, alkenyl or aryl radical, preferably a C1 to C8 alkyl radical, and R* contains an Si—OH-reactive group, such as an amino or epoxy group. This means that R* is, for example, alkylamino, alkenylamino or arylamino, preferably a C1 to C8 alkylamino, or glycidoxyalkyl, glycidoxyalkenyl or glycidoxyaryl, preferably C1 to C8-glycidoxyalkyl. m is 0, 1 or 2, n+m gives 3. Examples of suitable compounds of the formula II are 3-glycidoxypropyltrimethoxysilane, 3-glycidoxypropylmethyldimethoxysilane or 3-glycidoxypropylmethyldiethoxysilane, as well as 3-aminopropylmethyldiethoxysilane, 3-aminopropyldimethylethoxysilane or preferably 3-aminopropyltriethoxysilane or 3-aminopropyltrimethoxysilane.

The bifunctional reagents are typically employed as a 2 to 25%, preferably 5 to 10% (% by weight) solution in an organic solvent, such as, for example, toluene. The treatment of the gelling mould is preferably carried out at an elevated temperature of between 50 and 150° C.; for example, by refluxing in toluene. The duration of the treatment is generally between 1 and 40 hours, typically 10 to 25 hours. The treatment can be carried out by immersion of the entire mould or rinsing or filling of the interior of the gelling mould. Finally, the mould is rinsed with an organic solvent and filled with monomer sol.

It is furthermore possible to combine the said possibilities of surface activation. For example, it may be advantageous firstly to activate the surface of the gelling mould by etching and subsequently additionally to increase the surface area by treatment with alkoxysilanes, bifunctional reagents or particle slurries.

In a preferred embodiment, the process according to the invention for the production of monolithic mouldings in the gelling mould is also supported by the choice of monomer sol.

Another possibility for reducing or suppressing shrinkage of the mouldings during their production is the choice of a certain composition of the monomer sol. For example, it has been found that the addition of particles to the monomer sol greatly reduces the shrinkage rate.

The monomer sols used here otherwise correspond to the monomer sols known from the prior art (for example from U.S. Pat. No. 5,869,152, WO 95/03256 and particularly in WO 98/29350).

Japanese Laid-Open Specification JP(A) 2002-293657 discloses the addition of particles in sol-gel processes for the production of porous mouldings. However, the aim of the particle addition here is the reduction of the energy consumption during production. There is no indication that a similar principle can also be used under certain prerequisites for reducing the shrinkage rate of the mouldings during ageing.

In contrast to JP(A) 2002-293657, the present invention is preferably carried out using silica particles, which, as a consequence of their chemical structure, are also able to form a chemical bond to the monomer sol. In JP(A) 2002-293657, by contrast, aluminium oxide particles, for example, are copolymerised with alkoxysilanes via a sol-gel process, i.e. only incorporation of particles occurs here, but not chemical bonding to the silicate network.

Furthermore, the particles are, in contrast to JP(A) 2002-293657, preferably fed in at a later point in time, namely when the hydrolysis and polycondensation of the monomer sol has already taken place for about 5-120 minutes, preferably 15-45 minutes. At this point, there are already oligomers or a loose network consisting of $SiO_2$, into which the particles are then incorporated and mechanically stabilise the network owing to their rigid properties. It has been found that, in the case of addition in the pre-polymerised state of the monomer sol, which is preferred in accordance with the invention, the particles then added are distributed and suspended better. In addition, carrying out the process in this way has the effect that the macropore size remains substantially unaffected by the particle addition.

In the process according to JP(A) 2002-293657, a dependence of the macropore size on the amount of added particles is evident, for example a macropore size of 1 μm in the case of 0.25 g of aluminium oxide particles or a size of 0.7 μm in the case of 0.5 g of the same particles.

By contrast, carrying out the synthesis in accordance with the invention leaves the macropore size substantially unaffected. For example, the macropore size is not changed in the case of particle amounts of up to 1 g (per 50 ml of tetramethoxysilane).

It has been found that the above-described addition of particles effectively reduces the shrinkage rate. If, for example, various amounts of particles having a diameter of 50 nm (Aerosil 50 nm) are added to a monomer sol comprising 50 ml of tetramethoxysilane (TMOS), the following effect on the shrinkage rate arises:

|  | Amount of particles per 50 ml of TMOS [g] | | | |
| --- | --- | --- | --- | --- |
|  | 1 | 2 | 3 | 5 |
| Shrinkage rate [%] | 16.7 | 13.4 | 11.7 | 8.4 |

On addition of 15 to 20 g of porous spherical silica particles having a diameter of 0.1 to 3 μm (per 50 ml of TMOS), shrinkage can be suppressed virtually completely (analogously to Example 1).

SEM photomicrographs of mouldings produced by addition of particles to the monomer sol show that relatively small particles (50 to 250 nm) are incorporated completely into the silica framework and have no visible effect on the nature and shape of the framework. By contrast, a change in the surface structure is evident on use of particles having a diameter of 0.1 to 3 μm. The surface appears roughened by the polymerised particles; particles are clearly evident in the SEM photomicrograph.

Another possibility for reducing the shrinkage rate during the production of monolithic mouldings, in particular by sol-gel processes, is the addition of fibres. In accordance with the invention, fibres are structures with an elongated shape whose length is at least 5 times greater than their average diameter. The fibres can have a round, oval or irregular shape in diameter or may be flat. Suitable fibres are mineral fibres or synthetic fibres, such as, in particular, glass-ceramic or particularly preferably glass fibres. It has been found that effective stabilisation of the gel or monolithic moulding takes place on addition of fibres, and the shrinkage is thus greatly reduced. This process is also particularly suitable for the production of mouldings having relatively large diameters (>3 mm). The fibres are added to the monomer sol in amounts of between 1 and 50% by weight, preferably 2-30%. The stabilising action can be adapted through the choice of the fibres (for example glass fibres having a length of 0.1-5 mm (preferably 0.3-3 mm) and a diameter of 1-25 μm (preferably 5-10 μm)). For example, it may be advantageous to select long fibres (length>3 mm) or a combination of long and relatively short fibres for mouldings having relatively large diameters.

It has furthermore been found that the shrinkage rate during the production of monolithic mouldings can be reduced if the monomer sol comprises not only alkoxysilanes, but also at least 10%, preferably 20 to 100%, of organoalkoxysilanes.

Organoalkoxysilanes are silanes in which one to three alkoxy groups, preferably one alkoxy group, of a tetraalkoxysilane have been replaced by organic radicals, such as, preferably, C1 to C20 alkyl, C2 to C20 alkenyl or C5 to C20 aryl, particularly preferably C1 to C8 alkyl. Further organoalkoxysilanes are disclosed, for example, in WO 03/014450 or U.S. Pat. No. 4,017,528. These documents additionally disclose the production of particles or monolithic mouldings from organoalkoxysilanes. However, there is no indication that the use of organoalkoxysilanes is accompanied by a reduction in shrinkage during ageing.

The other constituents of the monomer sol generally correspond to those of the prior art. However, it may be possible that the concentration of certain substances has to be varied slightly since organoalkoxysilanes exhibit a different polarity, reactivity or even solubility to alkoxysilanes and thus, for example, affect the phase separation or formation of the gel element. Thus, for example, it may be advantageous to add a water-miscible organic solvent to the monomer sol in order to compensate for these effects. For example, ethanol or preferably methanol is suitable, where the molar ratio of water to solvent is typically between 10:1 and 1:5, preferably between 3:1 and 1:2.

It has furthermore proven advantageous for a stronger acid to be added to the monomer sol for hydrolysis instead of the usual acetic acid. 1 M $HNO_3$ is particularly suitable.

In the case of the use of organoalkoxysilanes, the formation of the pores may furthermore be influenced in a different way depending on what pore distribution the monolithic moulding is to have.

For example, the addition of a porogen, such as, for example, polyethylene glycol, can be omitted if desired, since organoalkoxysilanes themselves effect the formation of macroporous structures in the moulding due to the organic, non-hydrolysable radicals.

If mesopores are additionally desired, a detergent can be added (for example cationic detergents, such as CTAB ($CH_3(CH_2)_{15}N^+(CH_3)_3Br^-$), nonionic detergents, such as PEG (polyethylene glycol), Brij 56 ($CH_3(CH_2)_{15}$—($OCH_2CH_2)_{10}$—OH), Brij 58 ($CH_3(CH_2)_{15}$—($OCH_2CH_2)_{20}$—OH) and Triton® X detergents ($(CH_3)_3CCH_2CH(CH_3)$—$C_6H_4O$($CH_2CH_2O)_xH$, where x=8 (TX-114) or x=10 (TX-100), or block copolymers, such as Pluronic® P-123 ($(EO)_{20}$ (propylene oxide, PO)$_{70}$ $(EO)_{20}$ or Tween® 85 (polyoxyethylene sorbitan trioleate)), or alternatively an ageing process can be carried out, as disclosed, for example, in WO 95/03256 and particularly in WO 98/29350 (addition of a thermally decomposable substance, such as urea). The addition of hydrophilic or hydrophobic particles as described above is also possible.

Irrespective of the type of activation of the surface of the gelling mould or the monomer sol used, a calcination step is frequently carried out after the gelling and ageing of the gel. This causes all organic compounds or residues remaining in the moulding to be removed. Even on use of organoalkoxysilanes in the monomer sol, calcination can be carried out in the final synthesis step, so that the organic residues are removed from the moulding and a completely inorganic moulding is obtained. In particular on use of organoalkoxysilanes having sterically large organic radicals, this can be utilised to produce pores. The calcination is generally carried out at temperatures between 300 and 600° C. However, it is also equally possible to omit the calcination step or alternatively to select the temperature in such a way that the organic residues are not attacked. In this way, it is possible to influence the material properties of the mouldings, for example with respect to their chromatographic separation properties, through the organic residues. The temperatures in this case are typically between 100 and 300° C.

Table II below shows that the use of organoalkoxysilanes is an effective method for reducing the shrinkage rate. The higher the proportion of methyltrimethoxysilane (MTMS), the lower the shrinkage rate. The synthesis was carried out analogously to Examples 1 and 3.

| | Composition | |
|---|---|---|
| 100% of TMOS | TMOS/MTMS 2:1 | 100% of MTMS |
| Shrinkage [%] 25 | 12 | 0 |

Since, however, the use of organoalkoxysilanes influences the stability and porosity of the mouldings, it may be advantageous, for example, for certain applications to use not only organoalkoxysilanes, but instead mixtures of alkoxysilanes and organoalkoxysilanes. Gelling mould treatment according to the invention may then additionally reduce the shrinkage. Particles or fibres are particularly preferably additionally added to a monomer sol comprising organoalkoxysilanes.

Particularly advantageous in accordance with the invention is the combination of activation of the surface of the gelling mould with one or more of the said particular compositions of the monomer sol, i.e. addition of particles, addition of fibres and/or use of organoalkoxysilanes.

In a preferred embodiment, a gelling mould is firstly activated by surface etching and then filled with a mixture of an organoalkoxysilane (for example MTMS), a detergent, an acid (for example dilute nitric acid) and methanol. After gelling and parallel ageing at elevated temperature, a sorbent which is highly suitable for chromatography is obtained.

In general, the mouldings are, for use in chromatography, additionally provided with separation effectors after ageing or calcination. The various separation effectors and methods for their introduction are known to the person skilled in the art. Examples are given, for example, in WO 98/29350.

With the aid of the process according to the invention, it is possible to produce monolithic homogeneous porous mouldings which completely fill their gelling mould. The mouldings can remain in the gelling mould for chromatographic purposes and exhibit a pore structure which is just as homogeneous and separation efficiencies which are just as good as mouldings with claddings applied subsequently. The process according to the invention therefore greatly simplifies the production of monolithic mouldings.

Capillaries produced by the process according to the invention exhibit on average significantly better separation efficiencies than capillaries from the prior art. The reason for this is that dead spaces which arise unnoticed due to shrinkage processes are prevented more effectively in the process according to the invention.

The present invention accordingly also relates to monolithic porous mouldings which have been polymerised into their gelling mould and which can be produced by the process according to the invention by means of activation of the surface of the gelling mould and/or addition of particles, fibres or organoalkoxysilanes to the monomer sol. The mouldings according to the invention are distinguished by a structure which is homogeneous over the entire cross section.

Furthermore, the activation of the inside surface of the gelling mould causes the formation of chemical bonds between the moulding and the gelling mould, which cause particularly effective stabilisation.

Even without further comments, it is assumed that a person skilled in the art will be able to utilise the above description in the broadest scope. The preferred embodiments and examples should therefore merely be regarded as descriptive disclosure which is absolutely not limiting in any way.

The complete disclosure content of all applications, patents and publications mentioned above and below, in particular the corresponding application DE 10351798.7, filed on Jun. 11, 2003, is incorporated into this application by way of reference.

EXAMPLES

Example 1

100 ml of 0.01N acetic acid are introduced into a reaction vessel, and 10.2 g of PEG (polyethylene glycol for formation of the macroporous structure) are dissolved with stirring. 9.0 g of urea, which later causes mesopores on the surface of the silicate due to the formation of $NH_4OH$, are then added. The solution is cooled to 4° C. in an ice bath. When 4° C. has been reached, 50 ml of TMOS are added with stirring. The solution is stirred at 4° C. for a further 30 minutes. The solution is subsequently warmed to 30° C. in a water bath. After about 30 minutes, 15 g of spherical, porous silica particles having a size of 0.1-3 μm are stirred into the mixture. The mixture obtained in this way is subsequently transferred into a pretreated glass cartridge (internal diameter 3 mm, length 12.5 cm) and left in the water bath overnight. During this time, the monolithic moulding is permanently polymerised. It is subsequently dried for 2 days in a drying cabinet and then employed directly for chromatography. To this end, the cartridge was connected to an HPLC unit and firstly rinsed with about 200 ml of ethanol (flow rate: 0.2 ml/min) overnight, during which the remaining pore former (polyethylene glycol) was rinsed out. It was possible to separate 2 substances. The cartridge was subsequently calcined at 300° C. (about 4 hours) in order to burn out residual PEG. Fresh chromatographic testing again gave separation of two substances, with significantly better separation efficiency.

The glass cartridge was pre-treated with the reaction mixture before filling. Glass cartridges were placed in 1 M HCl solution and treated at 40° C. for at least 24 h. The tubes were subsequently rinsed with water and ethanol and dried in a drying cabinet for 24 h.

Example 2

100 ml of 0.01N acetic acid are introduced into a reaction vessel, and 10.2 g of PEG (polyethylene glycol) and 9.0 g of urea are dissolved with stirring. The solution is cooled to 4° C. in an ice bath. When 4° C. has been reached, 50 ml of TMOS are added with stirring. The solution is stirred at 4° C. for a further 30 minutes. The solution is subsequently warmed to 30° C. in a water bath. After 14 minutes, 5 g of an Aerosil (Aerosil OX50, Degussa) having a size of 40 nm are stirred into the mixture. The mixture obtained in this way is subsequently transferred into pre-treated glass cartridges (internal diameter 3 mm, length 12.5 cm) and left in the water bath at 30° C. overnight. During this time, the monolithic moulding is permanently polymerised. It is subsequently dried for 2 days in a drying cabinet and then employed directly for chromatography. The monolith is held firmly in the glass cartridge and can no longer be removed.

The glass cartridges were pre-treated with the reaction mixture before filling. 3 variants were selected for this purpose:
a) 5% of TMOS (tetramethoxysilane)
b) 5% of BTME (bis(trimethoxysilyl)ethane)
c) 5% of glymo (3-glycidoxypropyltrimethoxysilane)

In each case, 5% solutions of a)-c) in toluene were prepared. The glass cartridges were dipped into these solutions and refluxed overnight. The tubes were subsequently rinsed with ethanol and dried in a drying cabinet for 24 hrs.

Example 3

100 ml of 0.01N acetic acid are introduced into a reaction vessel, and 6.2 g of PEG (polyethylene glycol) and 10.0 g of urea are dissolved with stirring. The solution is cooled to 4° C. in an ice bath. When 4° C. has been reached, 37.5 ml of TMOS and 12.5 ml of MTMS (vol. ratio 3:1) are added with stirring. The solution is stirred at 4° C. for a further 30 minutes. The solution is subsequently warmed to 30° C. in a water bath and stirred for about a further 30 minutes. 1 g of an Aerosil (Aerosil OX50, Degussa) having a size of 40 nm or, in a second experiment, 3 g of Monospher® 500 particles (monodisperse, non-porous particles, 500 nm, Merck KGaA) are then stirred into the mixture. The mixture is subsequently treated with a disperser (Diax 900) for better distribution of the particles. The resultant mixtures are transferred into the pre-treated glass cartridges (internal diameter 3 mm, length 12.5 cm) and left in the water bath at 30° C. overnight. During this time, the monolithic moulding is permanently polymerised. It is subsequently dried for 2 days in a drying cabinet. The monolith is held firmly in the glass cartridge and can no longer be removed.

The glass cartridges were pre-treated with the reaction mixture as described under Example 2 before filling. 3 variants were selected for this purpose:
a) 5% of TMOS (tetramethoxysilane)
b) 5% of BTME (bis(trimethoxysilyl)ethane)
c) 5% of glymo (3-glycidoxypropyltrimethoxysilane)

In each case, 5% solutions of a)-c) in toluene were prepared. The glass cartridges were dipped into these solutions and refluxed overnight. The tubes were subsequently rinsed with ethanol and dried in a drying cabinet for 24 hrs.

Example 4

100 ml of 0.01N acetic acid are introduced into a reaction vessel, and 6.2 g of PEG (polyethylene glycol) and 10.0 g of urea are dissolved with stirring. The solution is cooled to 4° C. in an ice bath. When 4° C. has been reached, 37.5 ml of TMOS and 12.5 ml of MTMS (vol. ratio 3:1) are added with stirring. The solution is stirred at 4° C. for a further 30 minutes. The solution is subsequently warmed to 30° C. in a water bath and stirred for a further 14 minutes. 1 g of spherical, porous silica particles having a size of 0.1-3 µm (Purospher® STAR<3 µm, Merck KGaA) or, in a second experiment, 3 g of Monospher® 500 particles (monodisperse, non-porous particles, 500 nm, Merck KGaA) are then stirred into the mixture. The mixtures obtained in this way are subsequently transferred into pre-treated glass cartridges (internal diameter 3 mm, length 12.5 cm) and left in the water bath at 30° C. overnight. During this time, the monolithic moulding is permanently polymerised. It is subsequently dried for 2 days in a drying cabinet. The monolith is held firmly in the glass cartridge and can no longer be removed.

The glass cartridges were pre-treated with the reaction mixture as described under Example 2 before filling. 3 variants were selected for this purpose:
a) 5% of TMOS (tetramethoxysilane)
b) 5% of BTME (bis(trimethoxysilyl)ethane)
c) 5% of glymo (3-glycidoxypropyltrimethoxysilane)

In each case, 5% solutions of a)-c) in toluene were prepared. The glass cartridges were dipped into these solutions and refluxed overnight. The tubes were subsequently rinsed with ethanol and dried in a drying cabinet for 24 hrs.

The invention claimed is:

1. A process for the production of monolithic porous moldings which completely fill their gelling mold, comprising:
   a) provision of a gelling mold;
   b) activation of the gelling mold by surface etching, increasing the surface area and/or chemical modification;
   c) filling of the gelling mold with monomer sol;
   d) polymerization of the monomer sol and ageing of the resultant gel for the formation of pores, whereby the monolithic porous molding produced has an internal diameter of 0.5-50 mm.

2. The process according to claim 1, wherein the gelling mold is made from glass, glass-coated stainless steel or fused silica).

3. The process according to claim 1, wherein activation in b) is carried out by increasing the inside surface area of the gelling mold by treating the inside surface with alkoxysilanes and/or organoalkoxysilanes or slurries of particles.

4. The process according to claim 1, wherein activation in b) is carried out by chemical modification of the inside surface of the gelling mold by treating the surface with bifunctional reagents.

5. Process according to claim 1, wherein a sol-gel process is used for the production of the monolithic porous moldings.

6. A process for the production of monolithic porous moldings which completely fill their gelling mold, comprising:
   e) production of a gelling mold;
   f) activation of the gelling mold by surface etching, increasing the surface area and/or chemical modification;
   g) filling of the gelling mold with monomer sol; polymerization of the monomer sol and ageing of the resultant gel for the formation of pores, whereby the monolithic porous molding produced has an internal diameter of 0.5-50 mm, wherein a monomer sol which exhibits low shrinkage rates through the addition of organoalkoxysilanes is used in g).

* * * * *

UNITED STATES PATENT AND TRADEMARK OFFICE
CERTIFICATE OF CORRECTION

PATENT NO. : 7,666,336 B2 Page 1 of 1
APPLICATION NO. : 10/578193
DATED : February 23, 2010
INVENTOR(S) : Cabrera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 701 days.

Signed and Sealed this

Seventh Day of December, 2010

David J. Kappos
*Director of the United States Patent and Trademark Office*